US012477000B1

(12) United States Patent
Anderson et al.

(10) Patent No.: US 12,477,000 B1
(45) Date of Patent: Nov. 18, 2025

(54) COMPUTER-BASED SYSTEMS CONFIGURED FOR DOMAIN NAME CENTRAL BLOCKING SYSTEMS AND METHODS OF USE THEREOF

(71) Applicant: Go Daddy Operating Company, LLC, Tempe, AZ (US)

(72) Inventors: Ben Matthew Anderson, Copenhagen (DK); Tony Patrick Kirsch, Melbourne (AU); Quoc-Anh Nguyen Pham, Melbourne (AU)

(73) Assignee: Go Daddy Operating Company, LLC, Tempe, AZ (US)

( * ) Notice: Subject to any disclaimer, the term of this patent is extended or adjusted under 35 U.S.C. 154(b) by 0 days.

(21) Appl. No.: 19/053,825

(22) Filed: Feb. 14, 2025

(51) Int. Cl.
*H04L 9/40* (2022.01)
*G06F 8/65* (2018.01)

(52) U.S. Cl.
CPC ............ *H04L 63/1441* (2013.01); *G06F 8/65* (2013.01)

(58) Field of Classification Search
CPC ............ H04L 61/4511; H04L 63/1483; H04L 63/0236; H04L 63/1408; H04L 51/212; H04L 61/5007; H04L 63/1441; G06F 16/955; G06F 16/9566; G06F 8/65
See application file for complete search history.

(56) References Cited

U.S. PATENT DOCUMENTS

| | | | |
|---|---|---|---|
| 10,498,753 B1 * | 12/2019 | Pope | G06F 16/9566 |
| 11,552,923 B2 | 1/2023 | Stahura et al. | |
| 11,689,495 B2 | 6/2023 | Stahura et al. | |
| 11,870,750 B1 | 1/2024 | Shah et al. | |
| 2006/0080437 A1 * | 4/2006 | Lake | H04L 61/00 707/E17.115 |
| 2017/0180312 A1 * | 6/2017 | Sullivan | H04L 61/3025 |
| 2018/0103008 A1 * | 4/2018 | Slaunwhite | H04L 61/3025 |

* cited by examiner

*Primary Examiner* — Ali S Abyaneh
(74) *Attorney, Agent, or Firm* — CHIP LAW GROUP

(57) ABSTRACT

A method includes receiving an order to block a domain registration associated with a term, generating, on the term, a first and second to-be-blocked domain, the first to-be-blocked domain having a first domain extension and the second to-be-blocked domain having a second domain extension, wherein the first to-be-blocked domain is absent from a first zone file associated with the first domain extension and the second to-be-blocked domain is absent from a second zone file associated with the second domain extension, transmitting the first to-be-blocked domain to a first registry service provider managing the first domain extension to instruct the first registry service provider to automatically deny a first registration request for the first to-be-blocked domain, transmitting the second to-be-blocked domain to a second registry service provider managing the second domain extension to instruct the second registry service provider to automatically deny a second registration request for the second to-be-blocked domain.

24 Claims, 9 Drawing Sheets

800

```
┌─────────────────────────────────────────────────────────────┐
│ Receiving, by a first computing device, at least one order  │
│ from a second computing device to block at least one domain │
│ name registration associated with at least one term, the    │
│ second computing device being remote from and pre-          │
│ associated with the first computing device.            810  │
└─────────────────────────────────────────────────────────────┘
                              ↓
┌─────────────────────────────────────────────────────────────┐
│ Generating, by the first computing device executing a       │
│ variant software engine on the at least one term, at least  │
│ one first and second to-be-blocked domain name, the at      │
│ least one first to-be-blocked domain name belonging to a    │
│ first domain extension and the at least one second to-be-   │
│ blocked domain name belonging to a second domain extension  │
│ different from the first domain extension, wherein the at   │
│ least one first to-be-blocked domain name is absent from a  │
│ first zone file associated with the first domain extension  │
│ and the at least one second to-be-blocked domain name is    │
│ absent from a second zone file associated with the second   │
│ domain extension.                                      820  │
└─────────────────────────────────────────────────────────────┘
                              ↓
┌─────────────────────────────────────────────────────────────┐
│ Transmitting, by the first computing device, the at least   │
│ one first to-be-blocked domain name to at least one first   │
│ registration service provider managing the first domain     │
│ extension, so as to instruct the at least one first         │
│ registration service provider to automatically deny at      │
│ least one first registration request for the at least one   │
│ first to-be-blocked domain name.                       830  │
└─────────────────────────────────────────────────────────────┘
                              ↓
┌─────────────────────────────────────────────────────────────┐
│ Transmitting, by the first computing device, the at least   │
│ one second to-be-blocked domain name to at least one second │
│ registration service provider managing the second domain    │
│ extension, so as to instruct the at least one second        │
│ registration service provider to automatically deny at      │
│ least one second registration request for the at least one  │
│ second to-be-blocked domain name.                      840  │
└─────────────────────────────────────────────────────────────┘
```

FIG. 8

COMPUTER-BASED SYSTEMS CONFIGURED FOR DOMAIN NAME CENTRAL BLOCKING SYSTEMS AND METHODS OF USE THEREOF

FIELD OF TECHNOLOGY

The present disclosure generally relates to computer-based systems configured for domain name management, and particularly, to domain name central blocking systems and methods of use thereof.

BACKGROUND OF TECHNOLOGY

Computing resources, such as web servers, connected to the Internet are each assigned an Internet Protocol (IP) address that represents the online "location" of that resource. IP addresses, which are defined by a set of numerical label (e.g., 192.168.1.1 (IPv4) or 2001:0db8:85a3:0000:0000:8a2e:0370:7334 (IPv6)), are often difficult for humans to remember. Domain names are human-readable addresses corresponding to the IP addresses, and are used to access websites, like example.com. When a domain name is entered in a browser, the Domain Name System (DNS) translates the domain name into the corresponding IP address, so that the browser can connect to the correct server.

When a user register a domain name, DNS records may be created to map the domain to an IP address. These records may be stored on DNS servers. When someone types the domain name into a browser from a device, the device will query these DNS servers to find the corresponding IP address. Once the DNS records are updated, it can take some time (usually up to 48 hours) for the changes to propagate across all DNS servers worldwide.

A domain name may be a string of characters (e.g., numbers or letters) specifying a top-level domain (TLD) (e.g., .com, .net, .org) and one or more second-level domain (SLD). For example, "example.com" includes "example" as SLD and .com as TLD.

A domain name registry is a database that contains all the domain names registered in a specific TLD of the DNS. Registries can be government departments, non-profits, cooperatives, or commercial entities. For example, VeriSign operates the .com TLD, while Nominet manages .uk domains. Registry service providers (RSPs) manage the registration of domain names within their specific TLDs. They maintain administrative data and generate zone files, which contain the addresses of the name servers for each domain. When a party wishing to register a domain name submits a corresponding request, the RSP submits the request to the relevant registry. If the requested domain name is available (i.e., not then currently registered), the registry typically allows the domain name to be registered to the first requesting party.

Domain squatting, also known as cybersquatting, may involve registering, trafficking in, or using a domain name with the intent to profit from the goodwill of a trademark belonging to someone else. Squatters may register domain names that are identical or confusingly similar to existing trademarks or brand names (rights). A primary goal may be to sell the domain at a high price to the rightful right owner or to divert traffic for malicious purposes.

To prevent domain squatting, rights' holders may register their domain names early, including common misspellings and variations, in each TLD one by one. However, registering multiple domain names with multiple RSPs to prevent squatting can become expensive and time consuming, especially if the aim is to cover all possible variations and extensions of the rights. Alternatively, the rights' holders can monitor TLD registries for infringing domains and then dispute the registration or prosecute the registrant. However, monitoring services and legal actions can be expensive and time consuming. Besides, domain registrants can be located anywhere in the world, which can complicate legal proceedings, as different countries have different laws and enforcement mechanisms.

As such, it is desirable to have a centralized system that can allow rights holders to block domain name from being registered by others.

SUMMARY OF DESCRIBED SUBJECT MATTER

In some aspects, the techniques described herein relate to a computer-implemented method, including: receiving, by a first computing device, at least one first order from a second computing device to block at least one domain name registration associated with at least one term, the second computing device being remote from and pre-associated with the first computing device; generating, by the first computing device executing a variant software engine on the at least one term, at least one first and second to-be-blocked domain name, the at least one first to-be-blocked domain name having a first domain extension and the at least one second to-be-blocked domain name having a second domain extension different from the first the first domain extension, where the at least one first to-be-blocked domain name is absent from a first zone file associated with the first domain extension and the at least one second to-be-blocked domain name is absent from a second zone file associated with the second domain extension; transmitting, by the first computing device, the at least one first to-be-blocked domain name to at least one first registry service provider managing the first domain extension, so as to instruct the at least one first registry service provider to automatically deny at least one first registration request for the at least one first to-be-blocked domain name; and transmitting, by the first computing device, the at least one second to-be-blocked domain name to at least one second registry service provider managing the second domain extension, so as to instruct the at least one second registry service provider to automatically deny at least one second registration request for the at least one second to-be-blocked domain name.

In some aspects, the techniques described herein relate to a method, where the second computing device is configured to provide credential information to the first computing device before transmitting the at least one order.

In some aspects, the techniques described herein relate to a method, where the variant software engine includes at least one software service executing on the first computing device to algorithmically determine the at least one first and second to-be-blocked domain name with at least one threat input.

In some aspects, the techniques described herein relate to a method, where the at least one threat input includes at least one of: at least one unregisterable domain report containing at least one of a reserved domain name and a registered domain name, at least one domain-based message authentication, reporting, and conformance (DMARC) report, secure sockets layer (SSL) registration monitoring information including status and validity of an SSL certificate for at least one website, at least one abusive domain feed containing at least one domain name identified as being involved in malicious activities, the first and second zone file, and at least one threat intelligence feed containing at least a view on how a domain is being used to perpetrate abuses.

In some aspects, the techniques described herein relate to a method, where the variant software engine is configured to scan, by executing on the first computing device, a variant library to generate the at least one first and second to-be-blocked domain name.

In some aspects, the techniques described herein relate to a method, where the variant software engine is configured to update, by executing on the first computing device, variant library by adding the at least one first and second to-be-blocked domain name thereto.

In some aspects, the techniques described herein relate to a method, where the transmitting the at least one first to-be-blocked domain name includes providing, by the first computing device, an application programming interface (API) to the at least one first registry service provider to download the at least one first to-be-blocked domain name.

In some aspects, the techniques described herein relate to a method, where the first computing device is configured to allow the at least one first registry service provider to access the API only via an internet protocol (IP) address provided by the at least one first registry service provider.

In some aspects, the techniques described herein relate to a method, where the at least one first registry service provider is configured to access the API periodically on a predetermined time interval.

In some aspects, the techniques described herein relate to a method, where the at least one first registry service provider is configured to mark a first status of implementing the automatically denying the at least one first registration request for the at least one first to-be-blocked domain name.

In some aspects, the techniques described herein relate to a method, where the first status includes at least one of a queued-for-activation status, an activation-in-progress status, and an active status, where the queued-for-activation status reflects transmitting the at least one first to-be-blocked domain name to the at least one first registry service provider for processing; the activation-in-progress status reflects that the at least one first registry service provider begins to process an instruction to block the at least one first to-be-blocked domain name; and the active status reflects that the at least one first registry service provider has completed processing the blocking instruction.

In some aspects, the techniques described herein relate to a method, where the first computing device is configured to queue the at least one first registry service provider for the first status.

In some aspects, the techniques described herein relate to a method, further including: receiving, by a first computing device, at least one second order from the second computing device to release at least one to-be-released domain name for registration, the at least one to-be-released domain name having the first domain extension; and transmitting, by the first computing device, the at least one to-be-released domain name to the at least one first registry service provider, so as to instruct the at least one first registry service provider to release the at least one to-be-released domain name for registration.

In some aspects, the techniques described herein relate to a method, where the at least one first registry service provider is configured to mark a second status of implementing the releasing of the to-be-released domain name by the at least one first registry service provider.

In some aspects, the techniques described herein relate to a method, where the second status includes at least at least one of a queued-for-release status, a release-in-progress status and a closed status, where the queued-for-release status reflects transmitting the at least one to-be-released domain name to the at least one first registry service provider for processing; the release-in-progress status reflects that the at least one first registry service provider begins to process an instruction to release the at least one to-be-released domain name; and the closed status reflects that the at least one first registry service provider has completed processing the releasing instruction.

In some aspects, the techniques described herein relate to a method, where the first computing device is configured to queue the at least one first registry service provider for the second status.

In some aspects, the techniques described herein relate to a method, further including receiving, by the first computing device, a report indicating an unavailability of blocking the at least one first to-be-blocked domain name from the at least one first registry service provider.

In some aspects, the techniques described herein relate to a method, where the unavailability of blocking is due to that the at least one first to-be-blocked domain name has already been reserved or registered.

In some aspects, the techniques described herein relate to a method, where the second computing device is associated with the first registry service provider.

In some aspects, the techniques described herein relate to a computing system, including: at least one processor; and at least one memory storing a plurality of computing instructions configured to instruct the at least one processor to: receive at least one first order from a remote computing device to block at least one domain name registration associated with at least one term, the remote computing device being pre-associated with the system; generate, by executing a variant software engine on the at least one term, at least one first and second to-be-blocked domain name, the at least one first to-be-blocked domain name having a first domain extension and the at least one second to-be-blocked domain name having a second domain extension different from the first domain extension, where the at least one first to-be-blocked domain name is absent from a first zone file associated with the first domain extension and the at least one second to-be-blocked domain name is absent from a second zone file associated with the second domain extension; transmit the at least one first to-be-blocked domain name to at least one first registry service provider managing the first domain extension, so as to instruct the at least one first registry service provider to automatically deny at least one first registration request for the at least one first to-be-blocked domain name; and transmit the at least one second to-be-blocked domain name to at least one second registry service provider managing the second domain extension, so as to instruct the at least one second registry service provider to automatically deny at least one second registration request for the at least one second to-be-blocked domain name.

In some aspects, the techniques described herein relate to a computing system, where the variant software engine includes at least one software service executing on the computing system to algorithmically determine the at least one first and second to-be-blocked domain name with at least one threat input.

In some aspects, the techniques described herein relate to a computing system, where the at least one threat input includes at least one of: at least one unregisterable domain report containing at least one of a reserved domain name and a registered domain name, at least one domain-based message authentication, reporting, and conformance (DMARC) report, secure sockets layer (SSL) registration monitoring information including status and validity of an SSL certificate for at least one website, at least one abusive domain feed containing at least one domain name identified as being involved in malicious activities, the first and second zone file, and at least one threat intelligence feed containing at least a view on how a domain is being used to perpetrate abuses.

In some aspects, the techniques described herein relate to a computing system, where transmitting the at least one first to-be-blocked domain name includes providing, by the at least one processor, an application programming interface (API) to the at least one first registry service provider to download the at least one first to-be-blocked domain name.

In some aspects, the techniques described herein relate to a computing system, where the at least one first registry service provider is configured to access the API periodically on a predetermined time interval.

In some aspects, the techniques described herein relate to a computing system, where the computing instructions is further configured to instruct the at least one processor to: receive at least one second order from the remote computing device to release at least one to-be-released domain name for registration, the at least one to-be-released domain name having the first domain extension; and transmit the at least one to-be-released domain name to the at least one first registry service provider, so as to instruct the at least one first registry service provider to release the at least one to-be-released domain name for registration.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 8 is a flowchart illustrating an exemplary process for protecting a term in accordance with one or more embodiments of the present disclosure.

DETAILED DESCRIPTION

Figure 1:
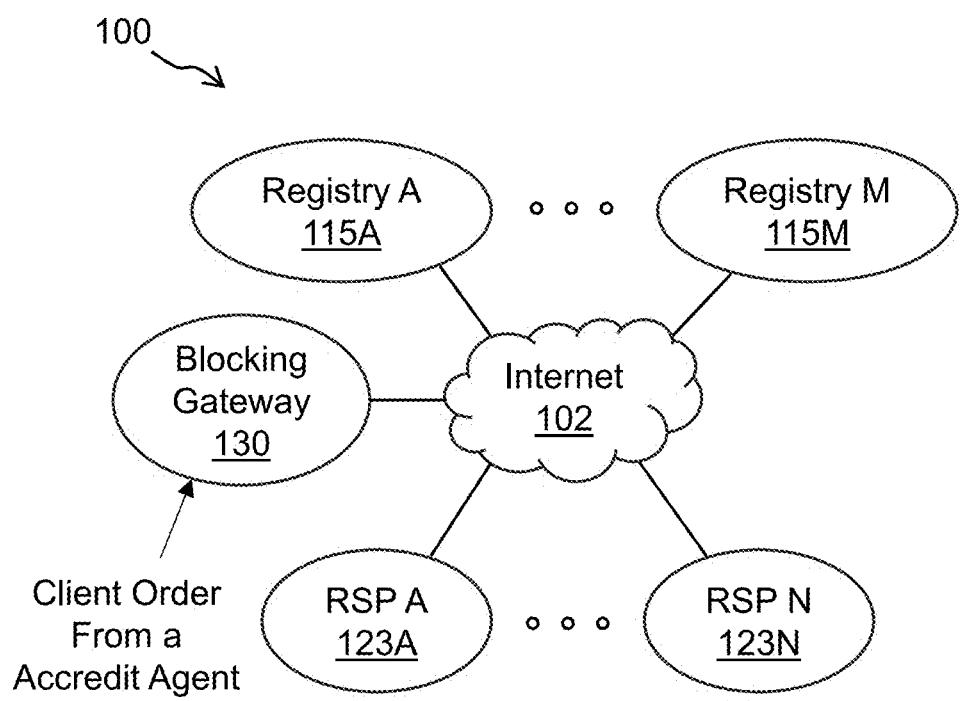
FIG. 1 is a block diagram illustrating a domain blocking system in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

In at least some embodiments, the present disclosure is directed to a centralized system that may allow rights holders to block domains that match their rights from being registered by others without registering such domains. The centralized system may transmit a block object to all connected Top Level Domain (TLD) registries and registry service providers (RSPs) in one transaction. In some embodiments, a TLD includes not only the TLD itself (e.g., .io), but also any extension that is contained within the TLD (e.g., .co.io, .com.io). To enable blocking services, a block object may be created that resides in both the centralized blocking system and each relevant registry and/or RSP to prevent domain registration that matches the rights. The block object that is stored in the centralized blocking system serves as a source of truth in referring to what may be required to be blocked. The registry and/or RSPs that are associated with the centralized blocking system are required to retrieve the created block objects and block the labels and/or domain names contained in the block object from registering. However, the centralized blocking system may not dictate how the block objects are stored and processed by the associated registry and/or RSPs. The term, "block object" or "block list object", as used herein generally refer to a programming item, such as list of labels and/or domain names and instructions, associated with blocking domain names from being registered.

The block objects automatically catch registered domains that match the rights when such domains become available instantaneously. The block objects can also move a domain name to a registered state and then retired without becoming available for third-party registration. The block objects may exist in the registries and RSPs and may provide a WHOIS response to a query stating that the requested domain name is blocked. The term, "WHOIS", as used herein refers to a query and response protocol used to look up information about the registered users or assignees of an Internet resource, such as domain names, IP address blocks, and autonomous systems. The WHOIS may act like a public directory, providing details about who owns a domain, their contact information, and other relevant data. The WHOIS database is managed by various domain registrars (e.g., RSPs) and is regulated by the Internet Corporation for Assigned Names and Numbers (ICANN). ICANN regulation applies to generic top level domains (gTLDs). Country code top level domains manage their own WHOIS in accordance with national policy. This tool is essential for ensuring transparency and accountability in domain name registration, helping with tasks like checking domain availability, resolving disputes, and protecting intellectual property. In some embodiments, some registries and RSPs may provide a Registration Data Access Protocol (RDAP) response which is a similar service to the WHOIS, as the registries and RSPs may only operate the RDAP. The term, "RDAP", as used herein refers to a network protocol used to look up registration data for Internet resources like domain names, IP addresses, and autonomous system numbers. The RDAP is a successor to the WHOIS protocol and delivers data in a standard, machine-readable JSON format. RDAP is based on RESTful web services and includes features like error codes, user identification, authentication, and access control.

However, a blocked domain name may not appear in the TLD zone file if the TLD zone file is published, as the TLD zone file may contain only information about a registered domain name and the blocked domain name may not be registered. The term, "TLD zone file", as used herein generally refers to a file that is published into a DNS and used by DNS resolvers. The TLD zone file may be maintained by a registry operator that contains a list of all the active second-level domain names within that TLD, along with the associated name server names and IP addresses. The TLD zone file can be retrieved via the Centralized Zone Data Service (CZDS) provided by the ICANN or another method agreed between a RSP and the centralized blocking system. The service allows users to request access to zone files from multiple TLD registry operators through a single platform.

In at least some embodiments, the centralized domain blocking system may prevents cybersquatting of rights in domains, and minimizes the need for the rights owner to hold extensive domain registration portfolios. In such cases, the centralized domain blocking system may simply serve as a defensive intellectual property (IP) enforcement strategy. The centralized system may also constantly monitor and catch domains that match a right where a third party has registered the domains and subsequently does not renew the registration. The blocking service provided by the centralized system can generate look-a-like domains to be blocked using different language sets to prevent consumer confusion that may lead to impersonation, phishing or other domain attacks.

In at least some embodiments, the centralized domain blocking system may allow rights holders to block domains across multiple registries in one transaction without registering the domains one by one. The centralized domain blocking system may be more cost-effective than domain registration, and the registrant does not need to service the domain by making it resolve to a website or any other service. In the centralized domain blocking system, while a domain may be "owned" by a brand owner, the domain name cannot be used for websites, emails or other activities. In effect, the blocking may removes the ability of others to register the domain. Such feature can be useful, particularly when the rights holder does not intend to use the domain, to avoid the hassle of maintaining the registration, renewing it each year, and paying ongoing registration fees or running the risk of accidentally losing it. As a result, domain blocking may provide peace of mind against domain fraud and brand impersonation while reducing the complexity and costs of domain management and litigation and creating operational efficiencies.

FIG. 1 is a block diagram illustrating a domain blocking system 100 in accordance with one or more embodiments of the present disclosure. The domain blocking system 100 may include a plurality of registries A-M 115A-115M, a plurality of registry service providers (RSPs A-N) 123A-123N and a blocking gateway 130 all connected by the Internet 102. Each of the plurality of registries 115-115M may be an organization responsible for managing and maintaining a specific TLD by keeping a database of all domain names registered under the specific TLD and ensure the corresponding DNS record is accurate. Examples of registries include Verisign (which manages .com and .net) and Public Interest Registry (which manages .org). On the other hand, each of the plurality of RSPs A-N 123A-123N may be a company that sells domain names to the public. The plurality of RSPs A-N 123A-123N act as intermediaries between the registrants (people or organizations who want to register domain names) and the plurality of registries A-M 115A-115M. Examples of RSPs include GoDaddy, Namecheap and Google Domains. Accredited agents or registrars working with the plurality of RSPs provide services like domain name registration, renewal, and management to domain registrants. The accredited agent may purchase and/or sponsor domains on behalf of the domain registrants.

In at least some embodiments, the plurality of registries 115A-115N and the plurality of RSPs A-N 123A-123N may form an alliance to collectively perform domain blocking functions. The alliance may employ the blocking gateway 130 to generate block list object which may then be communicated to the plurality of RSPs A-N 123A-123N. In at least some embodiments, the generated block list objects may additionally communicated to the plurality of registries A-M 115A-115M.

Referring again to FIG. 1, the blocking gateway 130 may receive a client order to protect certain rights from an accredited agent, and generate the block list object based on the client order. In some embodiments, to be accredited by the blocking gateway 130 as an agent, an entity may need to follow these steps:

First step—Eligibility Check: Ensure the agent meets the eligibility requirements set by the blocking gateway 130. This includes having the necessary qualifications and experience in brand safety and protection.

Second step—Application Submission: Submit an application to the blocking gateway 130, providing all relevant information, documentation, and evidence required for the type of rights being verified.

Third step—Verification Process: The blocking gateway 130 will review the application and verify the provided information. This may involve background checks and validation of the agent's credentials.

Fourth step—Training and Certification: Once the application is approved, the agent may need to undergo specific training programs and pass exams to receive certification from the blocking gateway 130.

Fifth step—Accreditation Approval: After successfully completing the training and verification process, the agent will be officially accredited by the blocking gateway 130 and authorized to represent and provide domain blocking services.

To log in the blocking gateway 130 as an accredited agent, the accredited agent may follow a predetermined authentication steps including password login and two-factor authentication (if applicable). Upon a successful login, the accredited agent may access a dashboard provided by the blocking gateway 130 from which the accredited agent can manage domain blocks, view reports and perform other administrative tasks.

In some embodiments, any one of the plurality of RSPs A-N 123A-123N may function as the accredited agent.

Figure 2:
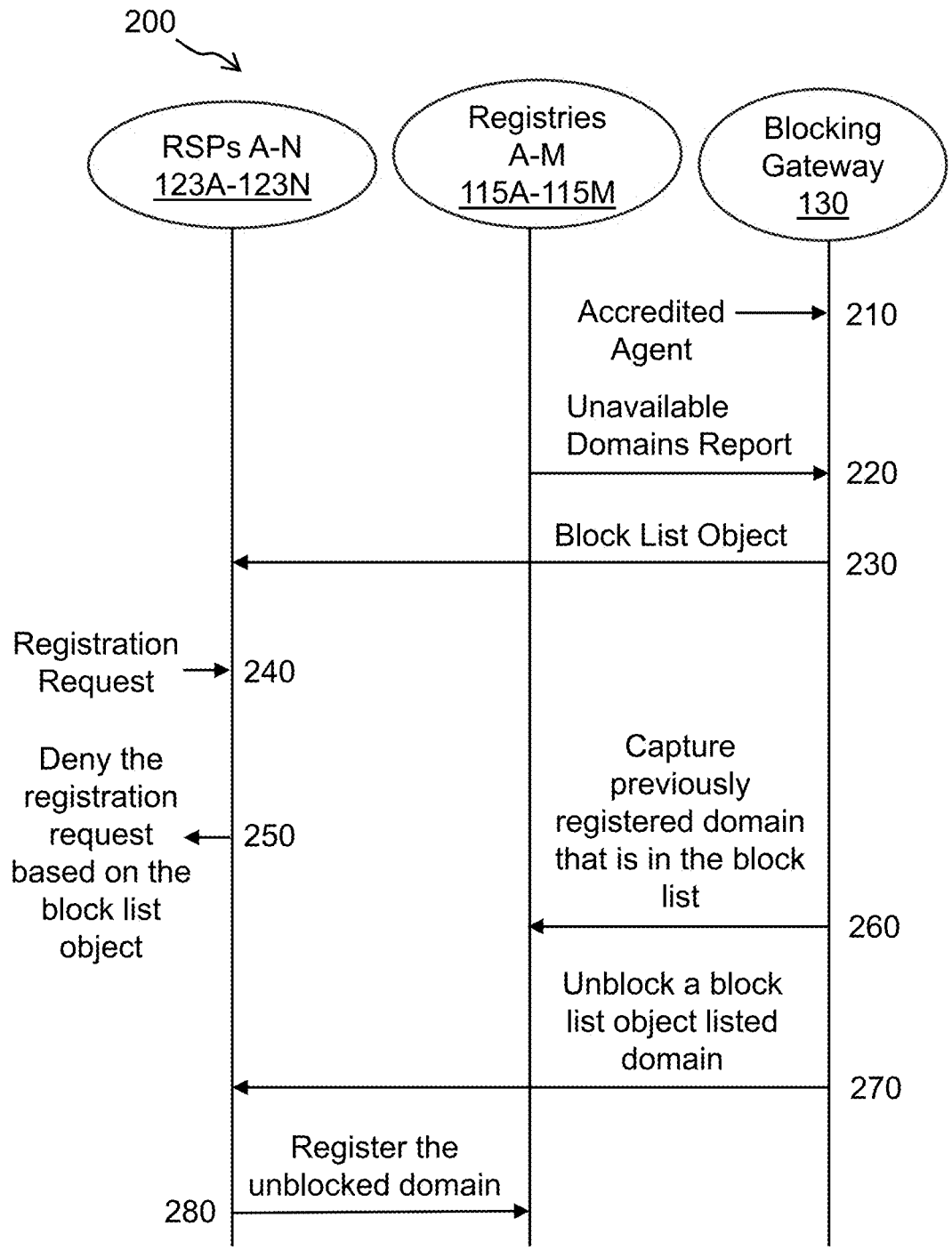
FIG. 2 is a flow diagram illustrating an exemplary procedure of the domain blocking system in operation in accordance with one or more embodiments of the present disclosure.

FIG. 2 is a flow diagram illustrating an exemplary procedure 200 of the domain blocking system 100 in operation in accordance with one or more embodiments of the present disclosure. The procedure 200 may include exemplary activities 210-280 as described herein below.

In activity 210, an accredited agent of the domain blocking system 200 may transmit a client order received from a registrant to the blocking gateway 130. In some embodiments, a RSP I 123*i* may be the accredited agent that receives the client order. In some embodiments, the client order may be an order to protect a certain right. In some other embodiments, the client order may be an order to unblock a previously block list object listed domain name, so that the client can register the unblocked domain.

In activity 220, upon receiving the blocking order, the blocking gateway 220 may obtain unavailable domains reports from the plurality of registries A-M 115A-115M, so that the blocking gateway 130 can have knowledge of current registered domains. The unavailable domains report may have a set format and contains all registered (regardless of them being "active in DNS" or not) and reserved domain names. In some embodiments, a registry I 115*i* may preserve some high value domains from being blocked. In some embodiments, the blocking gate way 130 may receive zone files (not shown) from the plurality of registries A-M 115A-115M. In some embodiments, the zone files may contain price information on each domain. The registry I 115*i* may set a threshold, any domain with a price above the threshold may be barred from blocking. In some embodiments, a list of high value domains may be provided to the blocking gateway 130 in activity 220.

In at least some embodiments, the blocking gateway 130 may processes a brand name (rights label) by replacing any spaces or special characters with DNS-permissible characters. These modified labels are known as the main labels and are blocked as part of a basic service. To enhance protection, the blocking gateway 130 may also algorithmically substitute characters in the main labels with confusingly similar or non-Latin script characters. For example, the "o" in "Godaddy" might be replaced with "0" to create the label "G0ddaddy". These altered labels are referred to as variant labels.

In activity 230, the blocking gateway 130 generates a block list object that may include both the main label and the variant labels generated from the client order and the information from the registries A-M 115A-115M. In some embodiments, the blocking list if posted to an application layer with application programming interface (API) accesses that each of the plurality of RSPs A-N 123A-123N connects to periodically, such as every few hours. In some embodiments, the blocking gateway 130 provides rules for the plurality of RSPs A-N 123A-123N to make the connection. In some embodiments, the connection are made with Restful API, so that the connection is passive in terms of the RSPs A-N 123A-123N need to come in and collect the block list objects.

In activity 240, a RSP J 123*i* may receive a request to register a domain.

In activity 250, if the requested domain is in the block list object, the RSP J 123*i* may deny the registration request.

In activity 260, the blocking gateway 130 may monitor each of the plurality of registries A-M 115A-115M. If a previously registered domain that is in the block list object become available, the blocking gateway 130 may immediately capture the newly available domain to prevent it from becoming available to the public.

In activity 270, if the client order received in activity 210 is an order to unblock a domain name from the block list object for temporary or permanent use, the blocking gateway 130 may update the block list object by removing the domain name.

In activity 280, the RSP I 123*i* may allow only the rights holder to register the unblocked domain name with the registry I 115*i* that manages the TLD of the unblocked domain name.

Figure 3:
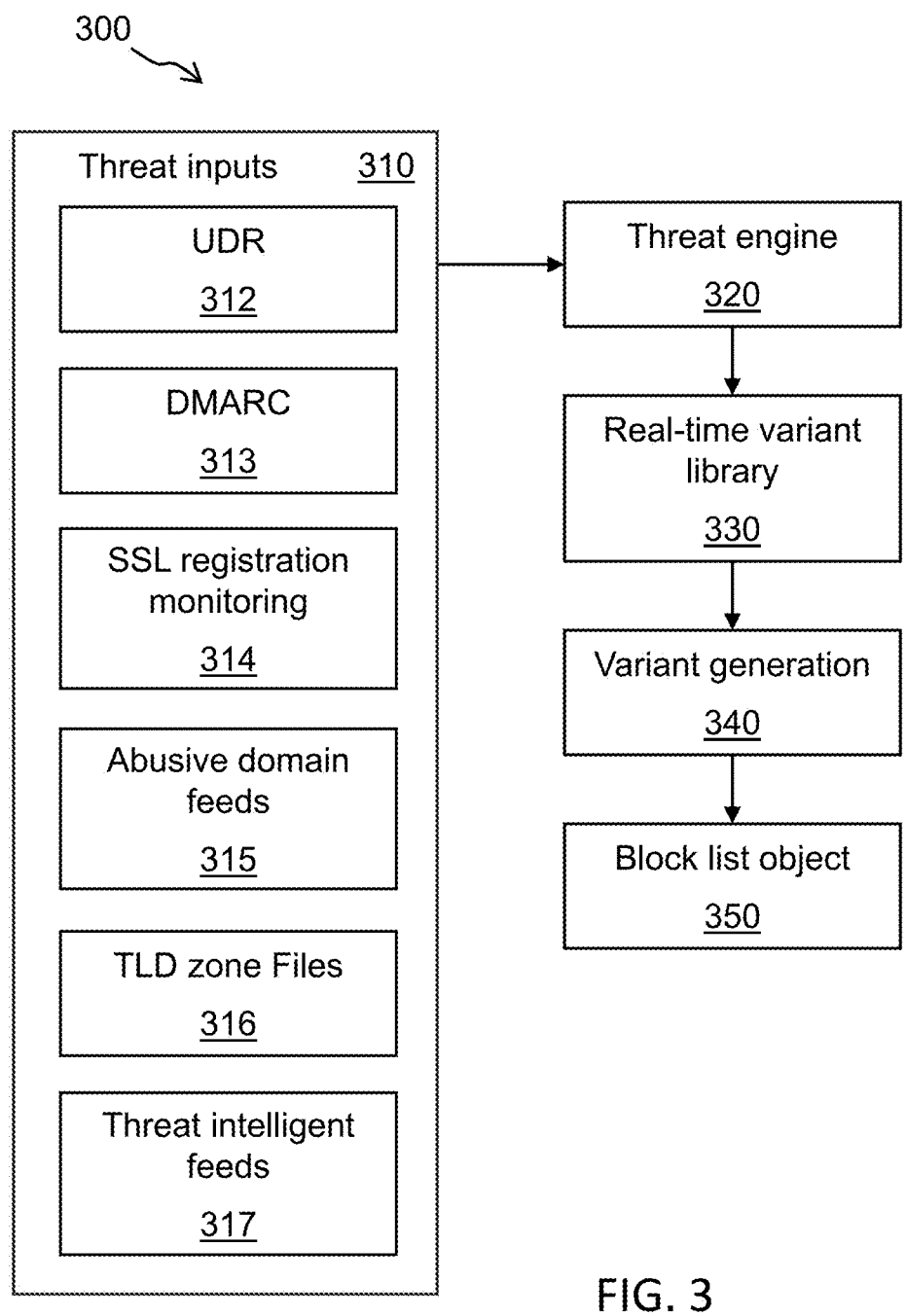
FIG. 3 is block diagram illustrating an exemplary architecture for generating the block list object in accordance with one or more embodiments of the present disclosure.

FIG. 3 is block diagram illustrating an exemplary architecture 300 for generating the block list object in accordance with one or more embodiments of the present disclosure. The architecture 300 may exemplarily include a threat engine 320 receiving various threat inputs 310. Output of the threat engine 320 may be provided to a real-time variant library 330 and then to variant generation module 340 to generate a block list object 350.

In at least some embodiments, the threat inputs 310 may include unregisterable domain reports (UDR) 312, domain-based message authentication, reporting, and conformance (DMARC) reports 313, secure sockets layer (SSL) registration monitoring information 314, abusive domain feeds 315, TLD zone files 316, and threat intelligent 317.

In some embodiments, the UDR 312 may include reserved domains and registered domains that are not present in standard zone file downloads. The reporting cadence of the UDR 312 may be significantly faster than traditional methods, eliminating the typical 24 to 48-hour latency. The UDR 312 may be provided by the plurality of RSPs A-N 123A-123N to the blocking gateway 130.

In some embodiments, the DMARC reports 313 may tell a domain holder which servers or third-party senders are sending mail for the domain, what percentage of messages from the domain pass DMARC, which servers or services are sending messages that fail DMARC, and what actions the receiving server takes on unauthenticated messages from the domain: none, quarantine, or reject. Bad actors may use email vulnerability to launch spoofing, phishing and malware attacks. Such attacks can give insight into real-time domain variations that form attack trends.

In some embodiment, the SSL is a security protocol that establishes an encrypted link between a web server and a browser. This ensures that all data transmitted between the server and the browser remains private and integral. The SSL registration monitoring information 314 may involve keeping track of the status and validity of SSL certificates for a website. This process ensures that the SSL certificates are always up-to-date and functioning correctly, which is crucial for maintaining secure, encrypted connections between the server and users' browsers. Similar to other attack vectors, bad actors often use inexpensive SSL certificates on malicious domains to appear legitimate. By monitoring SSL certificate creation, the architecture 300 can identify domain patterns that are used to deceive users.

In some embodiments, the abusive domain feeds 315 may be lists of domain names that have been identified as being involved in malicious activities such as phishing, malware distribution, spam, and botnet operations that may constitute the Domain Abuse Activity Reporting (DAAR). In the DAAR, ICANN may only provide a count of the malicious activities, but not the domain names, to the blocking gateway 130. Using the abusive domain feeds 315, the architecture 300 can monitor for trends and formations within domains flagged as abuse and identify trends.

In some embodiments, the TLD zone files 316 may contain information about domain names that are active within a specific TLD/zone or more accurately delegated in the TLD/zone. The TLD zone files may map active second-level domain names to the Internet Protocol (IP) addresses of their name servers. The legacy generic top-level domains (gTLDs), which are the original set of domain extensions that were introduced in the early days of the internet, account for the majority of abuses by volume. Monitoring TLD zone files 316, where UDR access may not be available, can offer a broader understanding of abuse trends albeit not in real-time.

In some embodiments, the threat intelligence feeds 317 may provide a view on how domains are being used to perpetrate abuses by monitoring current threat landscape not just on domains but through IP and DNS ranges.

Referring again to FIG. 3, the threat inputs 310 may be ingested in the threat engine 320 which is a software service constructed to algorithmically determine what constitutes a new threat or domain form that may be guarded against through blocking. The threat engine 320 may generate domain variants to be blocked from the threat inputs 310. The generated domain variants may then be provided to a real-time variant library 330, which may keep evolving with new domain variants. Outputs of the real-time variant library may then be scanned by a variant generation module 340 with existing variant libraries to form additional domain names to be blocked. These domain names may be added to the block list object 350 to be blocked by the plurality of RSPs A-N 123A-123N.

Figure 4:
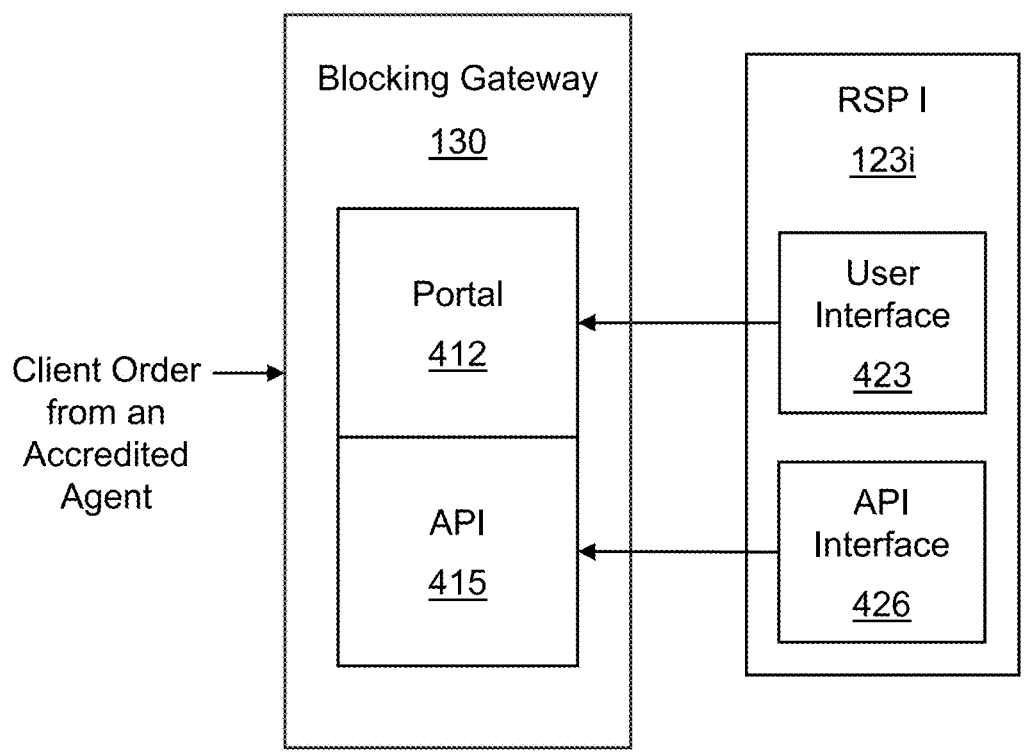
FIG. 4 is a block diagram illustrating an exemplary implementation of a blocking gateway in accordance with one or more embodiments of the present disclosure.

FIG. 4 is a block diagram illustrating an exemplary implementation of the blocking gateway 130 in accordance with one or more embodiments of the present disclosure. In at least some embodiments, the blocking gateway 130 may allow client blocking orders to be placed by accredited agents. Based on the client blocking order, the blocking gateway 130 may issue block list objects to a representative RSP I 123*i* from the plurality of RSPs A-N 123A-123N shown in FIG. 1. The block list objects may allow the RSP I 123*i* to block domain names in the TLDs of the system of the RSP I 123*i*.

As shown in FIG. 4, the blocking gateway 130 may provide the RSP I 123*i* with two primary interfaces: web-based interface, i.e., portal 412 and a RESTful JSON API interface 415. Both interfaces, the portal 412 and the API interface 415 may offer the same core functionality, with the portal 412 providing more advanced features that include: access management (e.g., add/remove IP addresses for access to the blocking gateway 130), bulk access to all block list objects via search and view, and downloading reports.

In at least some embodiments, the RSP I 123*i* may be provided with a single account with multiple portal users and a single API user for accessing the blocking gateway 130. For example, the blocking gateway 130 may be expected to be accessed at a predetermined portal with a predetermined API address.

In at least some embodiments, portal users may be provided with a username and password and a mandatory two-factor-authentication code sent to them via email upon every login. API users may be provided with an API key and may connect from a whitelisted IP address.

In at least some embodiments, each RSP account may include the TLDs on the RSP I 123*i* that participates in one or more products of the domain name blocking alliance. The blocking gateway 130 may be a single point where all client orders may be submitted and processed into a block list object and then provided to the RSP I 123*i*.

In at least some embodiments, the RSP I 123*i* can only connect to the API interface 415 of the blocking gateway 130 via self-submitted IP addresses. As an example, the RSP I 123*i* can:

Submit up to 50 IP addresses. In some embodiments, the number of IP addresses can be at least 500. In some other embodiments, the number of IP addresses can be at least 5,000, or any other suitable number.

Both IPv4 and IPv6 may be supported.

If an IPv4 address is submitted, the max subnet may be /20 which means that the subnet mask is 255.255.240.0. This allows for up to 4096 IP addresses within that subnet, with 4094 usable for hosts (since two addresses are reserved for network and broadcast addresses).

To access the blocking gateway 130 via API, the RSP I 123*i* may ensure that its client machine's IP address(es) has/have been added to its list of allowed IP addresses.

To login, the client server's IP address may be present in the allowed IP address list, and a predetermined method and a predetermined URL may be used. The request header may include the content type and encoded API Key.

When a client successfully logs in, the response may contain an id_token which the client will need to include in requests that follow the login. The id_token may exemplarily be valid for 30 minutes and so the RSP I 123*i* will need to ensure that a new id_token may be attained at least once every 30 minutes. In some embodiments, the id_token may be valid for longer (e.g., 1 hour) or shorter (e.g., 10 minutes).

In at least some embodiments, the account of the RSP I 123*i* can only have a single API user and so if the RSP I 123*i* plans to have multiple clients connect, these clients may use the same API and careful consideration needs to consider the following:

Every new successful login request may expire the previous token.

Track the "age" of the most current token to ensure that the API calls using an expired token can be avoided.

In at least some embodiments, the API interface 415 may allow the RSP I 123*i* to connect to a polling system of the blocking gateway 130. The RSP I 123*i* may be expected to retrieve and process each block list object issued by the blocking gateway 130 within a reasonable timeframe, i.e., at a predetermined time interval.

Figure 5:
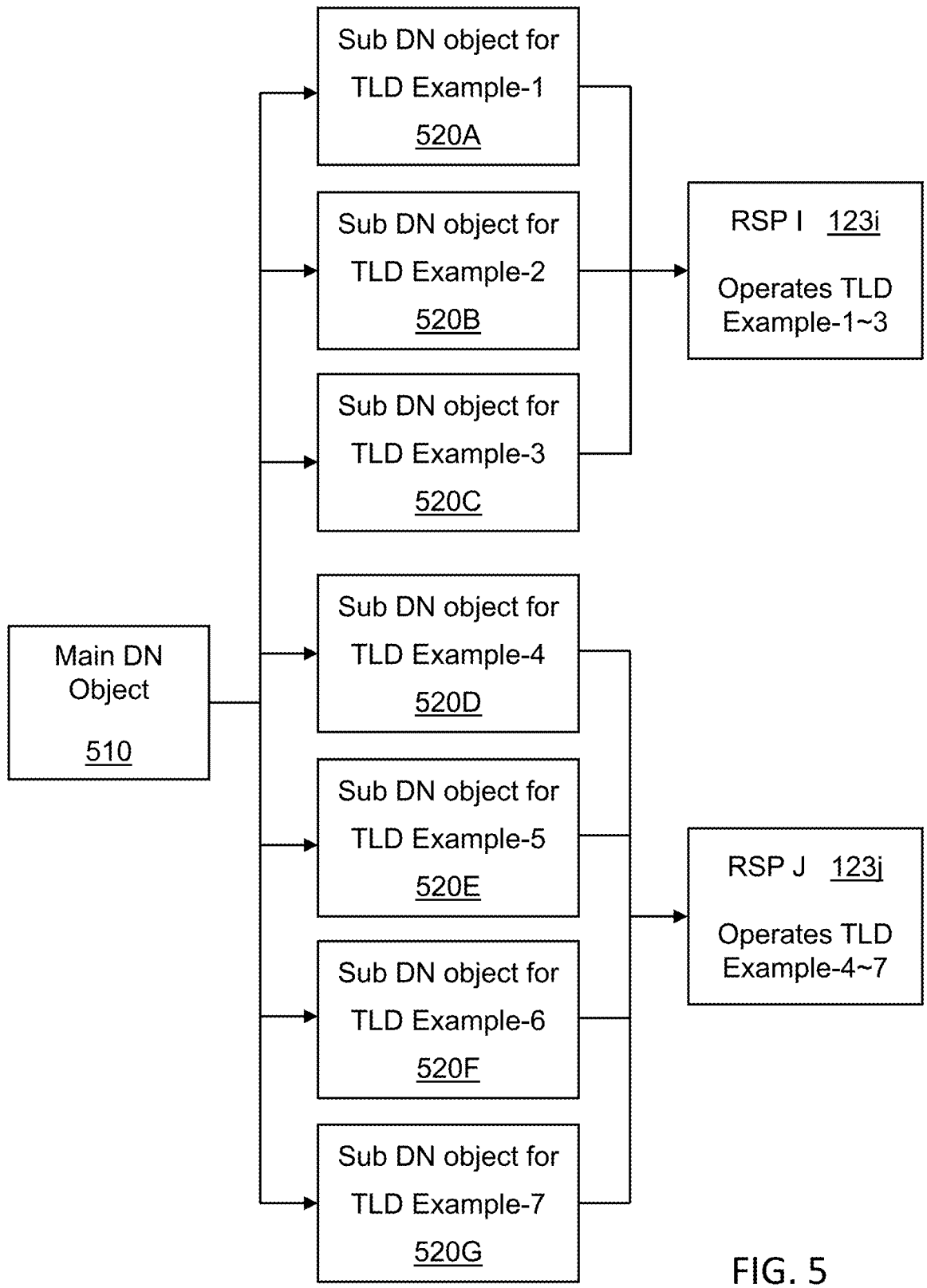
FIG. 5 is a block diagram illustrating an exemplary organization of block objects in accordance with one or more embodiments of the present disclosure.

FIG. 5 is a block diagram illustrating an exemplary organization of block objects in accordance with one or more embodiments of the present disclosure. When a main block domain name (DN) object 510 is provisioned in the blocking gateway 130 by an accredited agent, sub DN objects will be created for each RSP I 123*i* concerning each TLD that the RSP 123*i* may be associated with. The sub DN objects may be variant domain names or labels that may be required to be blocked from registration in their corresponding TLDs. The main DN object 510 may be generated from a client order such as to block registration of any domain name resembling a trademark. Sub DN objects 520A-520G may be domain variants derived from the main DN object 510. As an example shown in FIG. 5, sub DN objects 520A-520C may belong to TLD example-1 through TLD example-3, respectively; and sub DN objects 520D-520G may belong to TLD example-4 through TLD example-7, respectively. As a RSP I 123i may operate TLD example-1 through TLD example-3, sub DN objects 520A-520C may be provided to the RSP I 123i. Similarly, as RSP J 123i may operate TLD example-4 through TLD example-7, sub DN objects 520D-520G may be provided to the RSP J 123i. it is expected that the RSPi and RSPj may process their sub DN objects as quickly as possible and provide updates to their sub DN object to indicate which and why domain names may be unsuccessfully blocked and mark the sub DN object as complete. As an example, there may be two types of orders:

Standard: a single label that is required to be blocked in all participating TLDs.

Plus: multiple labels (that may include generated variants derived from the single label) that are required to be blocked in all participating TLDs.

In at least some embodiments, each sub DN object 520A-520G may be assigned a sub DN object identification (ID), and also include a reference to an ID of the associated main DN object 510. When viewing an assigned sub DN object ID, the RSP I 123i or RSP J 123j can identify the product type (standard or plus) as well as the main DN object ID.

In at least some embodiments, the RSP I 123i and RSP J 123j may use the main DN object ID to group together related sub DN objects to track how many block objects they have processed in their system and/or to more efficiently optimize the label retrieval process as each family of sub DN objects will include the same label(s) that is required to be blocked.

Figure 6:
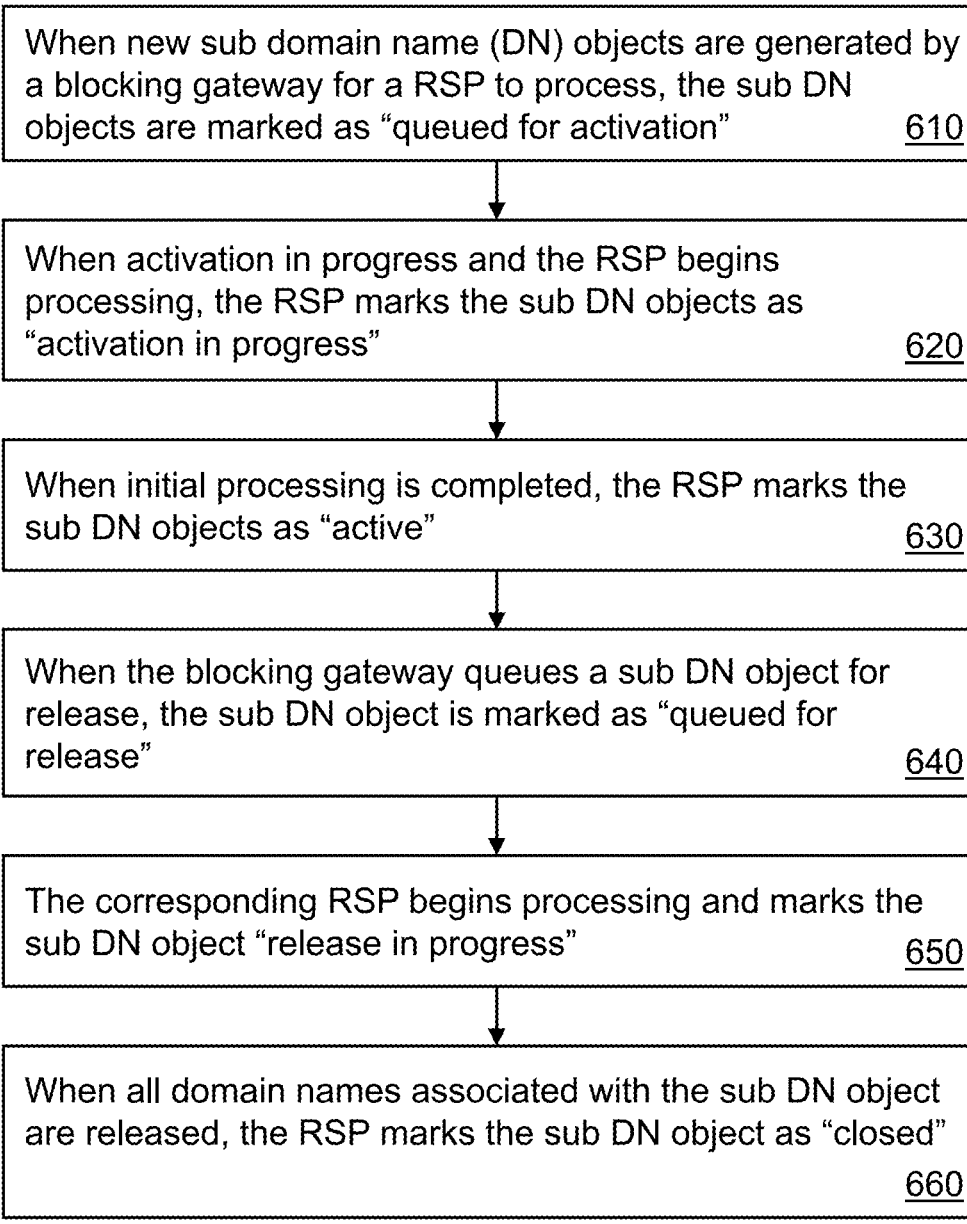
FIG. 6 is a block diagram illustrating an exemplary lifecycle of block objects in accordance with one or more embodiments of the present disclosure.

FIG. 6 is a block diagram illustrating an exemplary lifecycle of block objects in accordance with one or more embodiments of the present disclosure. The exemplary lifecycle may include states 610-660 as described herein below.

In state 610, when new sub DN objects are generated by a blocking gateway 130 for a RSP I 123i to process, the sub DN objects are marked as "queued for activation". In state 610, no action may be required by the RSP I 123i.

In state 620, when activation in progress and the RSP I 123i begins processing, the RSP I 123i marks the sub DN objects as "activation in progress". In state 620, action may be required of the RSP I 123i to retrieve and report a state value ActivationInProgress.

In state 630, when initial processing is completed, the RSP I 123i marks the sub DN objects as "active" signaling that all labels have been processed and the block object is active. During this time, the RSP I 123i can continuously update the block object, specifically updating the list of domain names that are not blocked (adding or removing from the list). In state 630, the RSP I 123i actively maintains the block and monitoring of the blocks.

In state 640, when the blocking gateway 130 queues a sub DN object for release, the sub DN object is marked as "queued for release" by the blocking gateway 130 in the event an order is canceled. The blocking gateway 130 may update the block object so that the RSP I 123i knows that it can delete the block on its system so that the label(s) are not blocked from registration. In state 640, action may be required of the RSP I 123i to retrieve and report a state value ReleaseInProgress.

In state 650, the corresponding RSP I 123i begins processing and marks the sub DN object "release in progress" to signal the process of release related to the block object is in progress. In state 650, the RSP I 123i may remove all the blocks for the related domain names and report a state value Closed once the release process is completed.

In state 660, when all domain names associated with the sub DN object are released, the RSP marks the sub DN object as "closed" to signal that the assigned block object has been closed. In state 660, no action is required of RSP I 123i.

In some embodiments, to minimize the amount of data processing required by the RSP I 123i, data regarding the length of the blocking term shall not be provided by the blocking gateway 130. As such, the RSP I 123i may be required to ensure that the block list objects are permanent and remain in place until the blocking gateway 130 issues an update to a block list object to delete the block list object entirely or to release a specific domain name therefrom.

In at least some embodiment, once a block object is received, the RSP I 123i are expected to process each label and report back if a label in a specific TLD cannot be blocked under one of the following conditions:

Domain exists;

Domain reserved;

Domain invalid (this may be due to policy on the side of RSP I 123i, such as unsupported language if the domain is IDN, and label length, etc.).

During the blocking process, the RSP I 123i may be expected to set the block object status to "ActivationInProgress". Once all labels are processed, the RSP I 123i may set the block object status to "Active".

In at least some embodiments, the RSP I 123i may not be required to advise which labels have been blocked as the blocking gateway 130 may infer the status information by identifying which labels in each TLD the RSP I 123i has reported as "not blocked" against the block list object sent to the RSP I 123i. Anything not reported as "not blocked" where the block object is set to be "active" will be considered as "blocked".

In at least some embodiments, the plurality of RSPs A-N 123A-123N may be expected to monitor the block list objects set in their systems continuously. Preferably the plurality of RSPs A-N 123A-123N may store the block list objects in their respective system as customer block registry objects.

As a successfully blocked label is intended to prevent the registration request for the domain, placing the block registry object in the way of the domain create and check logic would ensure that the request to check or create will respond as the domain is unavailable.

In at least some embodiments, a logic stack for domain creation and checking for a RSP I 123i may appear as follows:

If the domain name exists, return the domain name as "unavailable".

If the domain name does not exist but is reserved, return the domain name as "unavailable".

If the domain name does not exist and is not reserved but is blocked, return the domain name as "unavailable".

If the domain name does not exist, is not reserved, not blocked and is valid, then return the domain name as "available".

In at least some embodiments, a registrant may be able to independently verify a block object's provision without logging into their registrar account. As registrants do not interact directly with the RSP backend, the only authoritative interface they can go to is the RSP's registration data directory service (RDDS) which encompasses WHOIS and Registration Data Access Protocol (RDAP) which is developed as a replacement for WHOIS to address its limitations. RDAP provides access to current registration data in a more secure and standardized way.

As all gTLD Registries and the majority of ccTLD Registries offer a WHOIS interface, the expected output for a domain name lookup that is subject to being blocked by the RSP because of a provisioned block object is to return a customized WHOIS response where the subject is not one of the standard responses of "Data not found" or "domain name registration details".

In at least some embodiments, there may be a process rule where the following is done in order preference list:
1) If the domain name exists, return the domain name details.
2) Return the reservation message if the domain name does not exist but is reserved and the RSP has a unique domain name reservation message.
3) If the domain name does not exist and is not reserved but is blocked, then return the custom block message.
4) If the domain name does not exist, is not reserved, or is not blocked, then return "No Data Found".

In some embodiments, the processing hierarchy above may need to exist as WHOIS can only provide a single response.

In some embodiments, the above points 2) and 3) can change position based on the RSP's preference and what may be deemed more important in the hierarchal order.

In at least some embodiments, the blocking gateway 130 may requires that the WHOIS response for a label that has been blocked to be in a predetermined format, such as, without limitation, a single key-value pair (domain name) and a status of an action taken.

In at least some embodiments, if a domain name is already registered when the block registry object is created, domain purge auto-catch is to prevent the re-registration of the label if the domain name is purged. Therefore, if a domain name was reported as not being blocked due to it being already registered, in the even the domain name is purged and then auto-caught by the RSP, it may be expected that the RSP updates the "active" order by removing the label reported as not blocked which will infer (to the blocking gateway 130) that the label has now been blocked.

Figure 7:
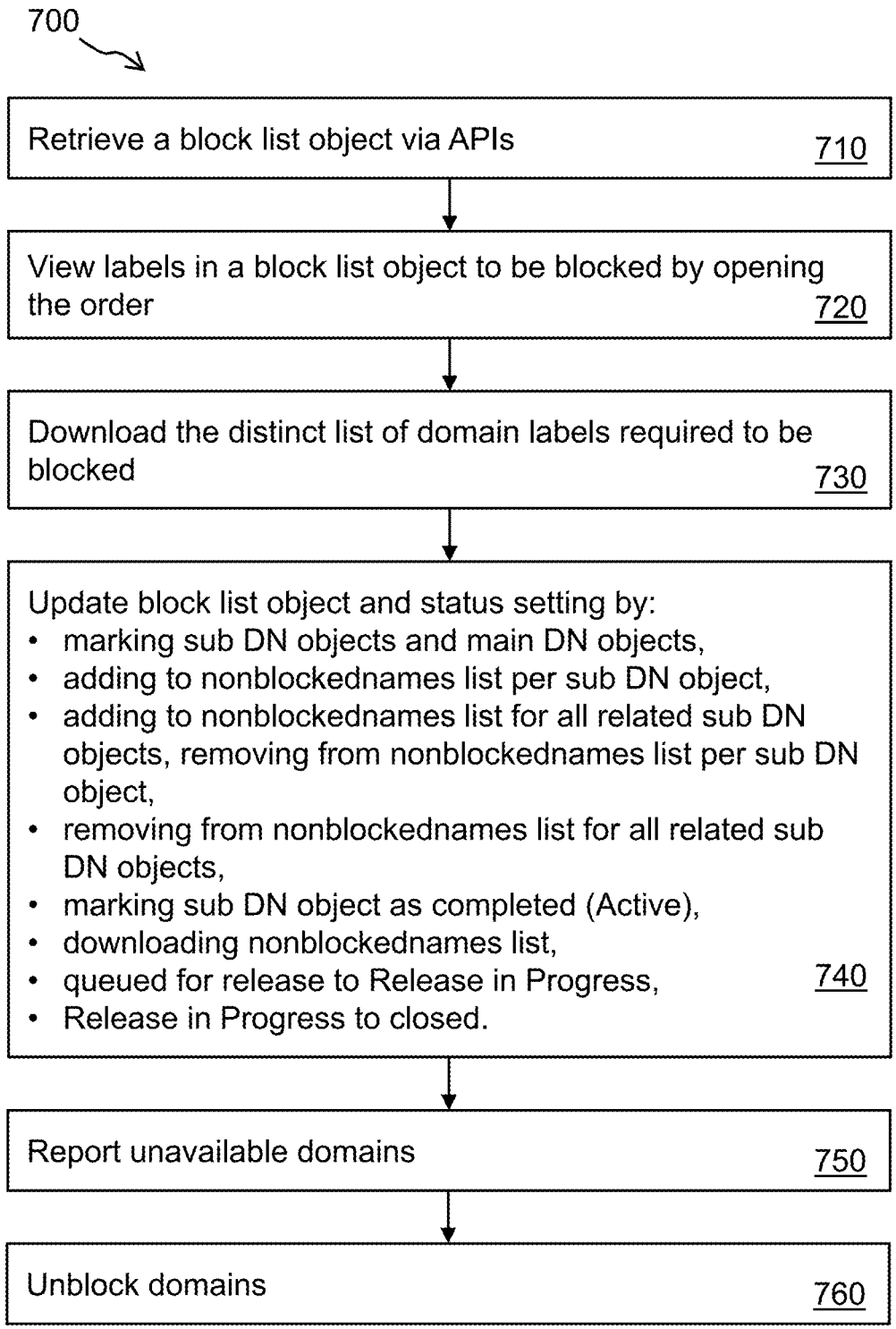
FIG. 7 is a flowchart illustration an exemplary process for blocking domain names from registration in accordance with one or more embodiments of the present disclosure.

FIG. 7 is a flowchart illustration an exemplary process 700 for blocking domain names from registration in accordance with one or more embodiments of the present disclosure. The exemplary process 700 may be implemented with the blocking gateway 130 in corporation with the plurality of RSPs A-N 123A-123N shown in FIG. 1, and may include boxes 710-760 as described herein below.

In box 710, a representative RSP I 123i of the plurality of RSPs A-N 123A-123N may retrieve a list of all block objects via APIs. The RSP I 123i can pull a list of all sub DN objects based on one or more of following filters:
A first filter is a sort by filter (which can include order by ascending or descending order) including:
Order create date; or
Order ID.
A second filter is an Order ID filter (either ascending or descending);
A third filter is a Limit filter, which is the total number of orders to display in a single response.

In box 720, to view all labels in an order to be blocked in the required TLDs, the RSP I 123i may open that single order by specifying the order ID.

The RSP I 123i may use a GET method to access the order at a predetermined URL.

Below are sample queries:
Show order 1 (a standard block that contains a single label to block).
Show order 2 (a plus block that contains multiple labels to block) and paginate it with a max of 12 per page viewing offset/page 0.

In the response, the following may be provided:
A list of all labels that are required to be blocked in an array.
The sub DN object details will consist of the following elements:
List—an array of all the labels that are required to be blocked. Internationalized domain names (IDNs) may be provided in Punycode encoded strings.

The term, Punycode, as used herein refers to a way to encode Unicode characters into the limited character set allowed for domain names. This allows domain names to include characters from various languages and scripts. For example, the domain name "munchen" would be encoded in Punycode as "xn-mnchen-3ya".

In box 730, the RSP I 123i may download the distinct list of domain labels required to be blocked from the blocking gateway 130. The list may contain the distinct domain labels with their accompanying parent orderID and if a label is blocked in more than one order, then the order IDs may be provided in the same row.

Header row (domainLabel,orderIDs).
Each row may be a distinct domain label followed by the parent orderID that it appears in and if there is more than one orderID that is appears in the orderIDs will be provided in the same row separated by a semi colon, e.g. the below shows three distinct labels that are required to be blocked with the label test3 showing that is appears in the parent order 1002 and 1003.
domainLabel,orderIDs
test1,1000
test2,1001
test3,1002; 1003

In at least some embodiments, these lists may be generated once every 2 hours by the blocking gateway 130 and they contain the distinct domain labels from main DN objects/sub DN objects that are in the following state:
PendingActivation
ActivationInProgress
Active Domain labels and/or the parent order ID will not be listed in the file if the main DN object/sub DN object is in PendingRelease, ReleaseInProgress or Closed states. If the RSP I 123i is intended to use this method to determine what domain labels it may need to block, it is recommended that the RSP I 123i compare the more recent last list downloaded with the current list to determine what domain label and/or parent order ID which it may need to:
Unlock on its system and release for registration and/or
Update the state of the order In at least some embodiments, the RSP I 123i may be required to ensure that the state of the orders are changed appropriately when the domain labels have been blocked which includes setting the relevant orders ActivationInProgress to acknowledge the order and be able to report back which the list of nonblocked names and then Active when appropriate.

In at least some embodiments, when the blocking orders are of multiple types, each type may have its own different list, the RSP I 123i may download each of the lists.

In box 740, the RSP I 123*i* may update block object and status setting by:
  marking sub DN objects and main DN objects,
  adding to nonblockednames list per sub DN object,
  adding to nonblockednames list for all related sub DN objects, removing from
  nonblockednames list per sub DN object,
  removing from nonblockednames list for all related sub DN objects,
  marking sub DN object as completed (Active),
  downloading nonblockednames list,
  queued for release to Release in progress,
  releasing in progress to closed; or
  any combination thereof.

In at least some embodiments, the marking sub DN objects may refer to the lifecycle of the sub DN objects. The RSP I 123*i* may be required to set sub DN objects to a specific state in order to complete specific tasks. For example, changing the state of a sub DN object from QueuedForActivation to ReleaseInProgress to begin the blocking process.

In at least some embodiments, the RSP I 123*i* may be able to set the state of multiple sub DN objects in a single request by providing the sub DN object ID and the relevant state of each sub DN object it wishes to update.

In at least some embodiments, as the RSP I 123*i* is provided with the main DN object ID in each sub DN object, the RSP I 123*i* can change the state of each sub DN object by conveniently supplying the main DN object ID for marking the main DN objects, by, for example without limitation, using a POST method at a predetermined URL. An exemplary body of the POST method can provide a pairing of an identifier of a particular order and its required state.

For example, the RSP I 123*i* may set status of multiple sub DN objects based on their processing of each sub DN object and setting them to the appropriate status.

Regarding adding to nonblockednames list per sub DN object, in some embodiments, the RSP I 123*i* may be required to report the domain names which have not been able to be blocked for each sub DN object and add to the list of domain names that have not been fully blocked because of one of the following reasons:
  Registered
  Reserved
  Invalid.

The RSP I 123*i* can perform this update while a sub DN object is in an execution state and/or an active state, by, without limitation, using an exemplary POST method at a predetermined URL with a prerequisite, e.g., sub DN object state be in a particular state.

In some embodiments, the body may consist of the fully qualified domain names which have not been blocked. The domain names are provided as an array that are group by the reason why they are not fully blocked and are added to the nonblockednames list.

In some embodiments, regarding the removing from nonblockednames list per sub DN object, the RSP I 123*i* may be required to remove the domain names added to its nonblockednames for sub DN objects which are now fully blocked (e.g., a domain name previously reported to not be fully blocked because it is registered is now fully blocked because it has been purged).

In some embodiments, the RSP I 123*i* can perform this update while a sub DN object is in a predetermined state, by, without limitation, using an exemplary POST method at a predetermined URL with a prerequisite, e.g. sub DN object state being in a particular state of action/execution.

The exemplary body may consist of the fully qualified domain names that the RSP I 123*i* may want to remove from its sub DN object's nonblockednames list.

Regarding the removing from nonblockednames list for all related sub DN objects, the RSP I 123*i* can omit the sub DN object ID. The blocking gateway 130 may identify all the sub DN objects related to the TLD for each domain name provided and remove it from the sub DN object's nonblockednames list using an exemplary POST method at a predetermined URL with a prerequisite, e.g., sub DN object state may be either ReleaseInProgress or Active.

The body may consist of the fully qualified domain names that the RSP wants to remove from their sub DN object's nonblockednames list.

For marking sub DN object as Completed (Active), when the RSP I 123*i* has completed processing its sub DN object, it may be required to mark them as active, and moving the sub DN object from 'ActivationInProgress' to 'Active'.

For downloading nonblockednames list, the RSP I 123*i* can download a sub DN object's list of "nonblockednames" reported. The list may be provided as a compressed CSV file using an exemplary GET method at a predetermined URL.

The file's content will be the label and the reason reported as to why it is presented in the nonblockednames list.

Regarding the queued for release to Release in Progress, the blocking gateway 130 may report to the RSP I 123*i* that specific suborders can be deleted, which means that the labels blocked in each respective TLD per sub DN object can be released for registration on the RSP's system.

In some embodiments, the blocking gateway 130 may change the status of the sub DN object to 'QueuedForRelease'. In this state, the RSP I 123*i* can start the process of releasing all blocked labels associated with the sub DN object in its system by marking the sub DN object as 'ReleaseInProgress'.

Regarding Release in Progress to closed, once all labels associated with the sub DN object have been released from being blocked, the RSP I 123*i* can close the sub DN object by marking it 'Closed'.

In box 750, the plurality of RSPs A-N 123A-123N may be required to provide an Unavailable Domain Report daily, for instance, to facilitate the generation of a separate report required by the blocking gateway 130. In some embodiments, there may be two ways in which the RSPs A-N 123A-123N can provide this information. A first way may be to upload a file. If the RSP I 123*i* has more than one TLD integrated with the blocking gateway 130, the RSP I 123*i* may have the choice of:
  Uploading a single file of all unavailable domains per TLD.
  Uploading a single file per TLD.

If the file upload is the chosen method, it may be expected that the file uploaded represents the full list of domains that are unavailable. When a file is successfully uploaded, it may replace the previous file.

In at least some embodiments, the blocking gateway 130 may accept two formats:
  The format described in: https://datatracker.ietf.org/doc/html/draft-sattler-unavailable-domain-report-03.
  Single column that contains the fully qualified domain name.
  If IDNs are provided, they are expected in Punycode encoded form (ACE labels).
  If wildcard reserves are included, it is not required that the RSP I 123*i* generates all permutations and it is acceptable to provide the wildcarded value in a single, e.g., example,*somelable*.example,RESERVED.

In at least some embodiments, the file uploaded may be either a TXT or CSV file that is compressed and have the extension .zip or .gz. A checksum is required and the RSP I 123*i* may use SHA512.

In some embodiments, a second way may be POST JSON updates. The RSP I 123*i* can POST updates to main their reported unavailable names via a series of 'add' and 'remove' submissions per 'zone/TLD'. So if the RSP I 123*i* has more than one participating 'zone/TLD', they may need to maintain the unavailable names list for each separately. As an example, there may be a maximum payload of 20 MB, so the RSPs A-N 123A-123N may consider splitting large updates into multiple posts.

In at least some embodiments, the RSP I 123*i* can maintain its list by zone/TLD via a series of adding and removing requests.

In some embodiments, an adding request can use an exemplary POST method at a predetermined URL, and set content-type to "application/json", and max payload to, e.g., 20 MB. A body of the adding request may be an array of fully qualified domain names reported as reserved, invalid or registered.

In some embodiments, a removing request can use an exemplary POST method at a predetermined URL, and set max payload to, e.g., 20 MB. A body of the removing request may be an array of fully qualified domain names that are to be removed from the unavailable names list.

In box 760, the RSP I 123*i* may unblock domains in response to rights holders' request that a specific label blocked by the blocking service provided by the blocking gateway 130 be made available for use (registration by requesting a 'Domain Unblock' in the blocking gateway 130 via its accredited agent.

In some embodiments, upon receiving a request to unblock a specific label, the blocking gateway may notify the relevant RSP I 123*i* and/or registry operator 115*i*. The RSP I 123*i* may cooperate with the unblock requests or directions from the blocking gateway 130 to unblock a label.

Rights holders may use an accredited registrar for the relevant TLD/Extension to register the unblocked domain name, and ensure they comply with all applicable TLD/Extension policies.

In some embodiments, the process for a 'Domain Unblock' is performed manually and may be communicated to a RSP outside of the blocking gateway system. Upon receiving the request from the blocking gateway 130, the RSP may be responsible for unblocking the domain name and allocating it, preferably using an allocation token or via an alternative process to be determined between the RSP and blocking gateway 130.

FIG. 8 is a flowchart illustrating an exemplary process 800 for protecting a term in accordance with one or more embodiments of the present disclosure. The exemplary process 800 may include boxes 810-840 as described herein below.

In box 810, the process 800 may include receiving, by a first computing device, an order from a second computing device to block at least one domain name registration associated with the term, the second computing device being remote from and pre-associated with the first computing device. In some embodiments, the first computing device may be associated with the blocking gateway 130; the second computing device may be associated with an accredited agent for accepting blocking orders; and the term may represent a right, such as a brand name.

In box 820, the process 800 may include generating, by the first computing device executing a variant software engine on the at least one term, at least one first and second to-be-blocked domain name, the at least one first to-be-blocked domain name belonging to a first domain extension and the at least one second to-be-blocked domain name belonging to a second domain extension different from the first domain extension, wherein the at least one first to-be-blocked domain name is absent from a first zone file associated with the first domain extension and the at least one second to-be-blocked domain name is absent from a second zone file associated with the second domain extension.

The term, "domain extension", as used herein generally includes TLDs as well as any extension within the TLDs. For example, .io is a TLD which is a country code for "British Indian Ocean Territory." Extensions within the .io TLD may include .co.io and .com.io. These extensions are also covered by the "domain extension".

In box 830, the process 800 may include transmitting, by the first computing device, the at least one first to-be-blocked domain name to at least one first registry service provider managing the first domain extension, so as to instruct the at least one first registry service provider to automatically deny at least one first registration request for the at least one first to-be-blocked domain name.

In box 840, the process 800 may include transmitting, by the first computing device, the at least one second to-be-blocked domain name to at least one second registry service provider managing the second domain extension, so as to instruct the at least one second registry service provider to automatically deny at least one second registration request for the at least one second to-be-blocked domain name.

Figure 9:
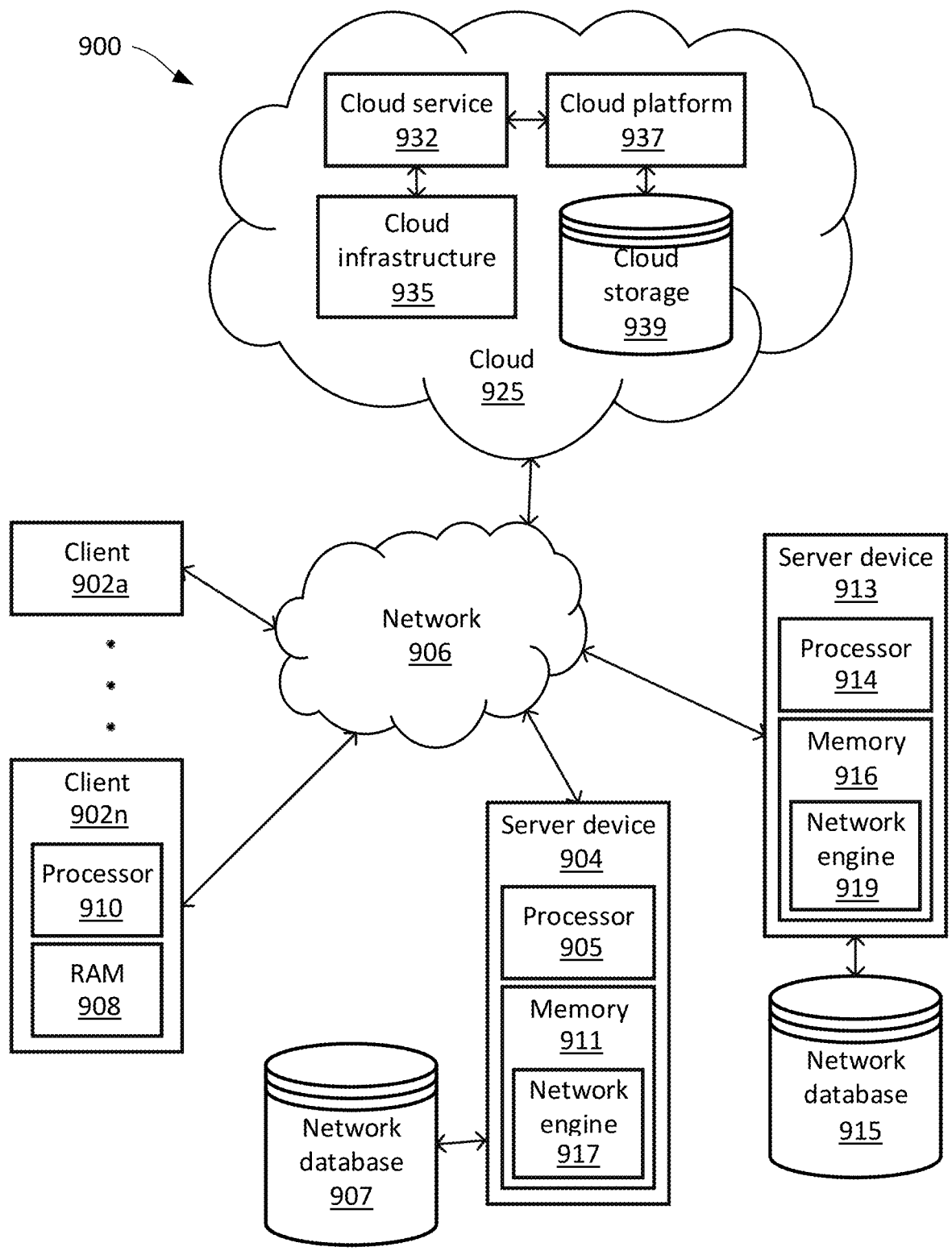
FIG. 9 is a block diagram illustrating an exemplary computer-based system/platform in accordance with one or more embodiments of the present disclosure.

FIG. 9 is a block diagram illustrating an exemplary computer-based system/platform 900 in accordance with one or more embodiments of the present disclosure. However, not all of these components may be required to practice one or more embodiments, and variations in the arrangement and type of the components may be made without departing from the spirit or scope of various embodiments of the present disclosure. In at least some embodiments, client computing devices 902*a* through 902*n* shown each at least includes a computer-readable medium, such as a random-access memory (RAM) 908 coupled to a processor 910 or FLASH memory (not shown) associated thereto. In at least some embodiments, processor 910 may execute computer-executable program instructions stored in memory 908. In at least some embodiments, processor 910 may include a microprocessor, an ASIC, and/or a state machine. In at least some embodiments, processor 910 may include, or may be in communication with, media, for example computer-readable media, which stores instructions that, when executed by processor 910, may cause processor 910 to perform one or more steps described herein. In at least some embodiments, examples of computer-readable media may include, but are not limited to, an electronic, optical, magnetic, or other storage or transmission device capable of providing a processor, such as the processor 910 of client 902*a*, with computer-readable instructions. In at least some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In at least some embodiments, the instructions may comprise code from any computer-programming language, including, for example, C, C++, Visual Basic, Java, Python, Perl, JavaScript, and etc.

In at least some embodiments, client computing devices 902a through 902n may also comprise a number of external or internal devices such as a mouse, a CD-ROM, DVD, a physical or virtual keyboard, a display, a speaker, or other input or output devices. In at least some embodiments, examples of client computing devices 902a through 902n (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In at least some embodiments, client computing devices 902a through 902n may be specifically programmed with one or more application programs in accordance with one or more principles/methodologies detailed herein. In at least some embodiments, client computing devices 902a through 902n may operate on any operating system capable of supporting a browser or browser-enabled application, such as Microsoft™, Windows™, and/or Linux. In at least some embodiments, client computing devices 902a through 902n shown may include, for example, personal computers executing a browser application program such as Microsoft Corporation's Internet Explorer™, Apple Computer, Inc.'s Safari™, Mozilla Firefox, and/or Opera. In at least some embodiments, through the client computing client devices 902a through 902n, users may communicate over exemplary network 906 with each other and/or with other systems and/or devices coupled to network 906.

As shown in FIG. 9, exemplary server devices 904 and 913 may be also coupled to network 506. Exemplary server device 904 may include a processor 905 coupled to a memory 911 that may store a network engine 917. Exemplary server device 913 may include a processor 914 coupled to a memory 916 that may store a network engine 919. In at least some embodiments, one or more client computing devices 902a through 902n may be mobile clients.

As shown in FIG. 9, exemplary server device 904 may be coupled to an exemplary network database 907; and exemplary server device 913 may be coupled to an exemplary network database 915. In at least some embodiments, exemplary databases 907 and 915 may be any type of database, including a database managed by a database management system (DBMS). In at least some embodiments, an exemplary DBMS-managed database may be specifically programmed as an engine that controls organization, storage, management, and/or retrieval of data in the respective database. In at least some embodiments, the exemplary DBMS-managed database may be specifically programmed to provide the ability to query, backup and replicate, enforce rules, provide security, compute, perform change and access logging, and/or automate optimization. In at least some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In at least some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In at least some embodiments, the exemplary DBMS-managed database may be specifically programmed to include metadata about the data that is stored.

As shown in FIG. 9, network 906 may be coupled to a cloud computing/architecture(s) 925. Cloud computing/architecture(s) 925 may include a cloud service 932 coupled to a cloud infrastructure 935 and a cloud platform 937, where the cloud platform 937 may be coupled to a cloud storage 939.

The computing system can also employ any number of software, firmware, and/or hardware configurations. For example, one or more of the example embodiments disclosed herein can be encoded as a computer program (also referred to as computer software, software applications, computer-readable instructions, and/or computer control logic) on a computer-readable medium.

The term "computer-readable medium," as used herein, can generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In at least some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores"

may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In at least some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In at least some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In at least some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In at least some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRL-POOL, RNGs).

The aforementioned examples are, of course, illustrative and not restrictive.

As used herein, the term "user" shall have a meaning of at least one user. In at least some embodiments, the terms "user", "subscriber" "consumer" or "customer" should be understood to refer to a user of an application or applications for implementing the functions of the CVCP as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

In at least some embodiments, the exemplary inventive computer-based systems, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In at least some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In at least some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In at least some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In at least some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node may be activated. In at least some embodiments and, optionally, in combination of any embodiment described above or below, the exemplary aggregation function may be a mathematical function that combines (e.g., sum, product, etc.) input signals to the node. In at least some embodiments and, optionally, in combination of any embodiment described above or below, an output of the exemplary aggregation function may be used as input to the exemplary activation function. In at least some embodiments and, optionally, in combination of any embodiment described above or below, the bias may be a constant value or function that may be used by the aggregation function and/or the activation function to make the node more or less likely to be activated.

The aforementioned examples are, of course, illustrative and not restrictive.

At least some aspects of the present disclosure will now be described with reference to the following numbered clauses.

Clause 1. A computer-implemented method, including: receiving, by a first computing device, at least one first order from a second computing device to block at least one domain name registration associated with at least one term, the second computing device being remote from and pre-associated with the first computing device; generating, by the first computing device executing a variant software engine on the at least one term, at least one first and second to-be-blocked domain name, the at least one first to-be-blocked domain name having a first domain extension and the at least one second to-be-blocked domain name having a second domain extension different from the first the first domain extension, where the at least one first to-be-blocked domain name is absent from a first zone file associated with the first domain extension and the at least one second to-be-blocked domain name is absent from a second zone file associated with the second domain extension; transmitting, by the first computing device, the at least one first to-be-blocked domain name to at least one first registry service provider managing the first domain extension, so as to instruct the at least one first registry service provider to automatically deny at least one first registration request for the at least one first to-be-blocked domain name; and transmitting, by the first computing device, the at least one second to-be-blocked domain name to at least one second registry service provider managing the second domain extension, so as to instruct the at least one second registry service provider to automatically deny at least one second registration request for the at least one second to-be-blocked domain name.

Clause 2. The method of clause 1, where the second computing device is configured to provide credential information to the first computing device before transmitting the at least one order.

Clause 3. The method of clause 1, where the variant software engine includes at least one software service executing on the first computing device to algorithmically determine the at least one first and second to-be-blocked domain name with at least one threat input.

Clause 4. The method of clause 3, where the at least one threat input includes at least one of: at least one unregisterable domain report containing at least one of a reserved domain name and a registered domain name, at least one domain-based message authentication, reporting, and conformance (DMARC) report, secure sockets layer (SSL) registration monitoring information including status and validity of an SSL certificate for at least one website, at least one abusive domain feed containing at least one domain name identified as being involved in malicious activities, the first and second zone file, and at least one threat intelligence feed containing at least a view on how a domain is being used to perpetrate abuses.

Clause 5. The method of clause 1, where the variant software engine is configured to scan, by executing on the first computing device, a variant library to generate the at least one first and second to-be-blocked domain name.

Clause 6. The method of clause 5, where the variant software engine is configured to update, by executing on the first computing device, variant library by adding the at least one first and second to-be-blocked domain name thereto.

Clause 7. The method of clause 1, where the transmitting the at least one first to-be-blocked domain name includes providing, by the first computing device, an application programming interface (API) to the at least one first registry service provider to download the at least one first to-be-blocked domain name.

Clause 8. The method of clause 7, where the first computing device is configured to allow the at least one first registry service provider to access the API only via an internet protocol (IP) address provided by the at least one first registry service provider.

Clause 9. The method of clause 7, where the at least one first registry service provider is configured to access the API periodically on a predetermined time interval.

Clause 10. The method of clause 1, where the at least one first registry service provider is configured to mark a first status of implementing the automatically denying the at least one first registration request for the at least one first to-be-blocked domain name.

Clause 11. The method of clause 10, where the first status includes at least one of a queued-for-activation status, an activation-in-progress status, and an active status, where the queued-for-activation status reflects transmitting the at least one first to-be-blocked domain name to the at least one first registry service provider for processing; the activation-in-progress status reflects that the at least one first registry service provider begins to process an instruction to block the at least one first to-be-blocked domain name; and the active status reflects that the at least one first registry service provider has completed processing the blocking instruction.

Clause 12. The method of clause 10, where the first computing device is configured to queue the at least one first registry service provider for the first status.

Clause 13. The method of clause 1, further including: receiving, by a first computing device, at least one second order from the second computing device to release at least one to-be-released domain name for registration, the at least one to-be-released domain name having the first domain extension; and transmitting, by the first computing device, the at least one to-be-released domain name to the at least one first registry service provider, so as to instruct the at least one first registry service provider to release the at least one to-be-released domain name for registration.

Clause 14. The method of clause 13, where the at least one first registry service provider is configured to mark a second status of implementing the releasing of the to-be-released domain name by the at least one first registry service provider.

Clause 15. The method of clause 14, where the second status includes at least at least one of a queued-for-release status, a release-in-progress status and a closed status, where the queued-for-release status reflects transmitting the at least one to-be-released domain name to the at least one first registry service provider for processing; the release-in-progress status reflects that the at least one first registry service provider begins to process an instruction to release the at least one to-be-released domain name; and the closed status reflects that the at least one first registry service provider has completed processing the releasing instruction.

Clause 16. The method of clause 14, where the first computing device is configured to queue the at least one first registry service provider for the second status.

Clause 17. The method of clause 1, further including receiving, by the first computing device, a report indicating an unavailability of blocking the at least one first to-be-blocked domain name from the at least one first registry service provider.

Clause 18. The method of clause 17, where the unavailability of blocking is due to that the at least one first to-be-blocked domain name has already been reserved or registered.

Clause 19. The method of clause 1, where the second computing device is associated with the first registry service provider.

Clause 20. A computing system, including: at least one processor; and at least one memory storing a plurality of computing instructions configured to instruct the at least one processor to: receive at least one first order from a remote computing device to block at least one domain name registration associated with at least one term, the remote computing device being pre-associated with the system; generate, by executing a variant software engine on the at least one term, at least one first and second to-be-blocked domain name, the at least one first to-be-blocked domain name having a first domain extension and the at least one second to-be-blocked domain name having a second domain extension different from the first domain extension, where the at least one first to-be-blocked domain name is absent from a first zone file associated with the first domain extension and the at least one second to-be-blocked domain name is absent from a second zone file associated with the second domain extension; transmit the at least one first to-be-blocked domain name to at least one first registry service provider managing the first domain extension, so as to instruct the at least one first registry service provider to automatically deny at least one first registration request for the at least one first to-be-blocked domain name; and transmit the at least one second to-be-blocked domain name to at least one second registry service provider managing the second domain extension, so as to instruct the at least one second registry service provider to automatically deny at least one second registration request for the at least one second to-be-blocked domain name.

Clause 21. The computing system of clause 20, where the variant software engine includes at least one software service executing on the computing system to algorithmically determine the at least one first and second to-be-blocked domain name with at least one threat input.

Clause 22. The computing system of clause 21, where the at least one threat input includes at least one of: at least one unregisterable domain report containing at least one of a reserved domain name and a registered domain name, at least one domain-based message authentication, reporting, and conformance (DMARC) report, secure sockets layer (SSL) registration monitoring information including status and validity of an SSL certificate for at least one website, at least one abusive domain feed containing at least one domain name identified as being involved in malicious activities, the first and second zone file, and at least one threat intelligence feed containing at least a view on how a domain is being used to perpetrate abuses.

Clause 23. The computing system of clause 20, where transmitting the at least one first to-be-blocked domain name includes providing, by the at least one processor, an application programming interface (API) to the at least one first registry service provider to download the at least one first to-be-blocked domain name.

Clause 24. The computing system of clause 23, where the at least one first registry service provider is configured to access the API periodically on a predetermined time interval.

Clause 25. The computing system of clause 20, where the computing instructions is further configured to instruct the at least one processor to: receive at least one second order from the remote computing device to release at least one to-be-released domain name for registration, the at least one to-be-released domain name having the first domain extension; and transmit the at least one to-be-released domain name to the at least one first registry service provider, so as to instruct the at least one first registry service provider to release the at least one to-be-released domain name for registration.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A computer-implemented method, comprising:
receiving, by a first computing device, at least one first order from a second computing device to block at least one domain name registration associated with at least one rights label, the second computing device being remote from and pre-associated with the first computing device;
generating, by the first computing device executing a variant software engine on the at least one rights label, at least one first and second to-be-blocked domain name, the at least one first to-be-blocked domain name having a first domain extension and the at least one second to-be-blocked domain name having a second domain extension different from the first domain extension, wherein the at least one first to-be-blocked domain name is absent from a first zone file associated with the first domain extension and the at least one second to-be-blocked domain name is absent from a second zone file associated with the second domain extension;

transmitting, by the first computing device, the at least one first to-be-blocked domain name to at least one first registry service provider managing the first domain extension, instructing the at least one first registry service provider to automatically deny at least one first registration request for the at least one first to-be-blocked domain name; and transmitting, by the first computing device, the at least one second to-be-blocked domain name to at least one second registry service provider managing the second domain extension, instructing the at least one second registry service provider to automatically deny at least one second registration request for the at least one second to-be-blocked domain name, wherein the at least one first registry service provider is configured to mark a first status of implementing the automatically denying the at least one first registration request for the at least one first to-be-blocked domain name, wherein the first status comprises at least one of a queued-for-activation status, an activation-in-progress status, or an active status.

2. The method of claim 1, wherein the second computing device is configured to provide credential information to the first computing device before transmitting the at least one order.

3. The method of claim 1, wherein the variant software engine comprises at least one software service executing on the first computing device to algorithmically determine the at least one first and second to-be-blocked domain name with at least one threat input.

4. The method of claim 3, wherein the at least one threat input comprises at least one of:
   at least one unregisterable domain report containing at least one of a reserved domain name and a registered domain name,
   at least one domain-based message authentication, reporting, and conformance (DMARC) report,
   secure sockets layer (SSL) registration monitoring information comprising status and validity of an SSL certificate for at least one website,
   at least one abusive domain feed containing at least one domain name identified as being involved in malicious activities,
   the first and second zone file, and
   at least one threat intelligence feed containing at least a view on how a domain is being used to perpetrate abuses.

5. The method of claim 1, wherein the variant software engine is configured to scan, by executing on the first computing device, a variant library to generate the at least one first and second to-be-blocked domain name.

6. The method of claim 5, wherein the variant software engine is configured to update, by executing on the first computing device, variant library by adding the at least one first and second to-be-blocked domain name thereto.

7. The method of claim 1, wherein the transmitting the at least one first to-be-blocked domain name comprises providing, by the first computing device, an application programming interface (API) to the at least one first registry service provider to download the at least one first to-be-blocked domain name.

8. The method of claim 7, wherein the first computing device is configured to allow the at least one first registry service provider to access the API only via an internet protocol (IP) address provided by the at least one first registry service provider.

9. The method of claim 7, wherein the at least one first registry service provider is configured to access the API periodically on a predetermined time interval.

10. The method of claim 1, wherein
    the queued-for-activation status reflects transmitting the at least one first to-be-blocked domain name to the at least one first registry service provider for processing;
    the activation-in-progress status reflects that the at least one first registry service provider begins to process an instruction to block the at least one first to-be-blocked domain name; and
    the active status reflects that the at least one first registry service provider has completed processing the blocking instruction.

11. The method of claim 1, wherein the first computing device is configured to queue the at least one first registry service provider for the first status.

12. The method of claim 1, further comprising:
    receiving, by a first computing device, at least one second order from the second computing device to release at least one to-be-released domain name for registration, the at least one to-be-released domain name having the first domain extension; and
    transmitting, by the first computing device, the at least one to-be-released domain name to the at least one first registry service provider, instructing the at least one first registry service provider to release the at least one to-be-released domain name for registration.

13. The method of claim 12, wherein the at least one first registry service provider is configured to mark a second status of implementing the releasing of the to-be-released domain name by the at least one first registry service provider.

14. The method of claim 13, wherein the second status comprises at least at least one of a queued-for-release status, a release-in-progress status and a closed status, wherein
    the queued-for-release status reflects transmitting the at least one to-be-released domain name to the at least one first registry service provider for processing;
    the release-in-progress status reflects that the at least one first registry service provider begins to process an instruction to release the at least one to-be-released domain name; and
    the closed status reflects that the at least one first registry service provider has completed processing the releasing instruction.

15. The method of claim 13, wherein the first computing device is configured to queue the at least one first registry service provider for the second status.

16. The method of claim 1, further comprising receiving, by the first computing device, a report indicating an unavailability of blocking the at least one first to-be-blocked domain name from the at least one first registry service provider.

17. The method of claim 16, wherein the unavailability of blocking is due to that the at least one first to-be-blocked domain name has already been reserved or registered.

18. The method of claim 1, wherein the second computing device is associated with the first registry service provider.

19. A computing system, comprising:
    at least one processor; and
    at least one memory storing a plurality of computing instructions configured to instruct the at least one processor to:
        receive at least one first order from a remote computing device to block at least one domain name registration associated with at least one rights label, the remote computing device being pre-associated with the system;

generate, by executing a variant software engine on the at least one rights label, at least one first and second to-be-blocked domain name, the at least one first to-be-blocked domain name having a first domain extension and the at least one second to-be-blocked domain name having a second domain extension different from the first domain extension, wherein the at least one first to-be-blocked domain name is absent from a first zone file associated with the first domain extension and the at least one second to-be-blocked domain name is absent from a second zone file associated with the second domain extension;

transmit the at least one first to-be-blocked domain name to at least one first registry service provider managing the first domain extension, instructing the at least one first registry service provider to automatically deny at least one first registration request for the at least one first to-be-blocked domain name; and transmit the at least one second to-be-blocked domain name to at least one second registry service provider managing the second domain extension, instructing the at least one second registry service provider to automatically deny at least one second registration request for the at least one second to-be-blocked domain name, wherein the at least one first registry service provider is configured to mark a first status of implementing the automatically denying the at least one first registration request for the at least one first to-be-blocked domain name, wherein the first status comprises at least one of a queued-for-activation status, an activation-in-progress status, or an active status.

20. The computing system of claim 19, wherein the variant software engine comprises at least one software service executing on the computing system to algorithmically determine the at least one first and second to-be-blocked domain name with at least one threat input.

21. The computing system of claim 20, wherein the at least one threat input comprises at least one of:
    at least one unregisterable domain report containing at least one of a reserved domain name and a registered domain name,
    at least one domain-based message authentication, reporting, and conformance (DMARC) report,
    secure sockets layer (SSL) registration monitoring information comprising status and validity of an SSL certificate for at least one website,
    at least one abusive domain feed containing at least one domain name identified as being involved in malicious activities,
    the first and second zone file, and
    at least one threat intelligence feed containing at least a view on how a domain is being used to perpetrate abuses.

22. The computing system of claim 19, wherein transmitting the at least one first to-be-blocked domain name comprises providing, by the at least one processor, an application programming interface (API) to the at least one first registry service provider to download the at least one first to-be-blocked domain name.

23. The computing system of claim 22, wherein the at least one first registry service provider is configured to access the API periodically on a predetermined time interval.

24. The computing system of claim 19, wherein the computing instructions is further configured to instruct the at least one processor to:
    receive at least one second order from the remote computing device to release at least one to-be-released domain name for registration, the at least one to-be-released domain name having the first domain extension; and
    transmit the at least one to-be-released domain name to the at least one first registry service provider, instructing the at least one first registry service provider to release the at least one to-be-released domain name for registration.

\* \* \* \* \*